United States Patent Office 2,873,421
Patented Feb. 10, 1959

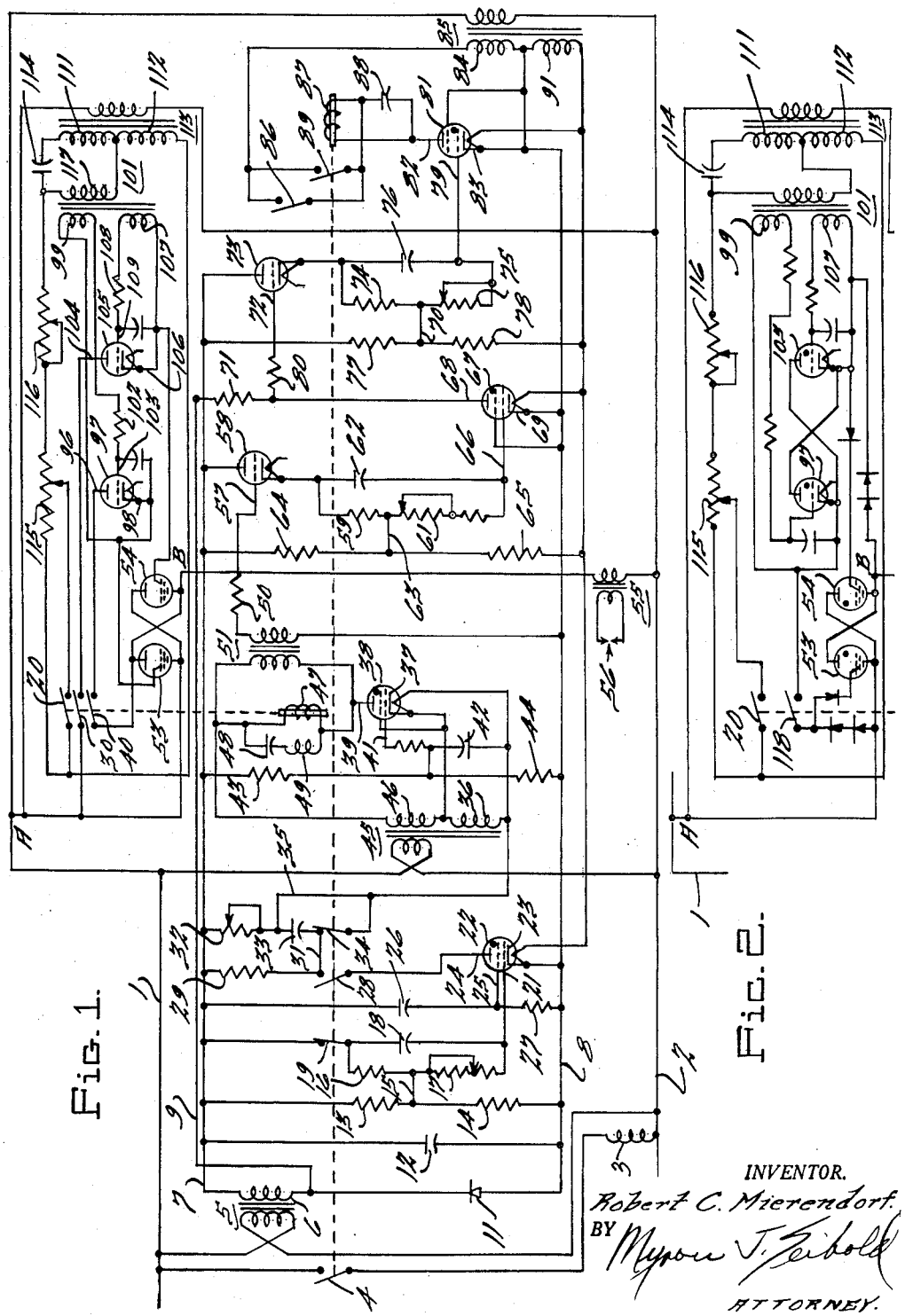

2,873,421

ELECTRIC WELDER CONTROL SYSTEM

Robert C. Mierendorf, Wauwatosa, Wis., assignor to Square D Company, Detroit, Mich., a corporation of Michigan Application April 25, 1955, Serial No. 503,611

11 Claims. (Cl. 323—58)

This invention relates to an electric welder control system, particularly where employing relatively high flux density transformers, and has for its object the provision of such a system which initiates a current flow cycle with a minimum magnetizing transient.

Another object of the invention is an electric welder control system employing high flux density transformers providing a substantially optimum phase angle between initiation of welding current and the supply voltage so as to provide a minimum magnetizing transient.

Another object of the invention is an electric welder control system in accordance with the preceding object in which the initial optimum phase angle is changed on the second half cycle of welding current to initiate each succeeding half cycle at normal phase angle with the supply voltage.

Another object of the invention is the provision of an electric welder control system having ignitron tubes effecting the flow of current from a high flux density transformer to the weld in which the firing of the ignitrons is controlled by electronic tubes whose grids are fed from a phase shift circuit, the constants of which provide for firing of the initiating tubes and their associated ignitrons at a normal phase angle with the supply voltage determined either by the power factor of the load or by the percent of full current desired, or by both, and in which provision is made for a change in the phase shift angle for initial ignitron tube firing to the optimum providing a minimum magnetizing transient.

Other objects and features of the invention will be readily apparent to those skilled in the art from the specification and appended drawing illustrating certain preferred embodiments in which:

Figure 1 is a diagrammatic representation of an electric welding control circuit including the arrangement of applicant's invention.

Figure 2 is a partial diagrammatic representation showing a modified form of ignitron firing control.

In the figures, the numerals 1 and 2 represent a pair of main supply lines which are connected to a source of electric energy which is not illustrated. Connected across the lines 1 and 2 is a valve solenoid 3 controlled by a normally open contact 4; a transformer 5 is connected across the main supply lines 1 and 2 and has a secondary 6 serving to supply voltage to conductors 7, 8 and 9. A half wave rectifier 11 in circuit with the secondary 6 cooperates with a smoothing capacitor 12 which is connected between the conductors 7 and 8 to provide these conductors with a pulsating direct current voltage.

Serially disposed across the conductors 7 and 8 is a pair of resistors 13 and 14 whose midpoint is connected by conductor 15 to a timing circuit comprised of a fixed resistor 16, a variable resistor 17 in series therewith and a capacitor 18 connected in parallel with these two resistors. This timing circuit is connected to the conductor 7 through a normally closed contact 19 and also to the control grid 21 of an electronic tube 22 having a cathode 23 and an anode 24, cathode 23 being connected to conductor 8 and the anode 24 being connected to conductor 7 through a normally open contact 28 and a resistor 29. Tube 22 has a shield grid 25 which is connected between a capacitor 26 and a resistor 27 serially disposed between the conductors 7 and 8.

Connected to the resistor 29 is a conductor 31 which serves to connect a timing circuit comprising an adjustable resistor 32 and a capacitor 33 in series therewith to the anode circuit of tube 22. Capacitor 33 is normally shorted out by a contact 34 which is normally closed and conductor 35 is connected from the junction of the adjustable resistor 32 and the capacitor 33 to a secondary 36 of a transformer 45, the primary of which is connected across lines 1 and 2, secondary 36 supplying the heater for the cathode 37 of an electronic tube 38. This tube has an anode 39 and a control grid 41 and the principal electrodes are supplied from a secondary 46 of the transformer 45. A capacitor 42 is connected between the control grid 41 and the cathode 37 of the tube 38 and to a point between the voltage dividing resistors 43, 44 which are serially disposed between the conductors 7 and 8. A relay coil 47 is disposed between the anode 39 of tube 38 and the transformer secondary 46, the relay coil 47 being paralleled by capacitor 48 and an inductor 49, this parallel circuit being further paralleled by the primary of a transformer 51. The reactive qualities of the capacitor 48 and inductor 49 are chosen so that a substantial change of energy between these elements will occur.

The relay coil 47 controls the closure of three normally open contacts 20, 30, 40 mechanically set so that the contact 20 will close shortly after the closure of contacts 30, 40; that is, within the first half cycle. The stroke of the relay is preferably designed so that contacts 30, 40 close during the first half cycle following the first conducting half cycle of the tube 38, no particular synchronizing closure point being required. Contacts 20, 30 and 40 control a firing circuit according to this invention which controls the firing of ignitrons 53, 54 which effect energization of the primary high flux density of a welding transformer 55 passing current through the work to be welded at the conventionally designated electrodes 56. The firing circuits will be explained in detail hereinafter.

The secondary of transformer 51 is connected through a resistor 50 to a control grid 57 of an electronic tube 58, the anode of which is connected to the conductor 7, the cathode being connected to a timing circuit comprising a fixed resistor 59, a variable resistor 61 in series therewith and a parallel capacitor 62, a conductor 63 being connected to the junction between the fixed and variable resistors 59, 61 to introduce a voltage into the timing circuit from a voltage divider circuit comprising resistors 64 and 65 serially connected between the conductor 7 and a cathode heater circuit to be subsequently explained.

The capacitor 62 is connected to the control grid 66 of an electronic tube 67 having an anode 68 and a cathode 69, the anode 68 being connected through a resistor 71 to the conductor 9 while the cathode 69 is connected to conductor 8. The resistor 71 is connected through another resistor 80 to the control grid 72 of an electronic tube 73, the anode of which is connected to the conductor 7 while the cathode is connected to another timing circuit comprising a fixed resistor 74 and a variable resistor 75 in series therewith, the series circuit being paralleled by capacitor 76. A voltage is introduced into this timing circuit by a conductor 70 from a voltage divider circuit comprising resistors 77 and 78 serially connected between conductor 7 and the aforementioned cathode heater circuit.

The capacitor 76 is connected to the control grid 79 of an electronic tube 81 having an anode 82 and a cathode 83, these electrodes of tube 81 being connected across one secondary 84 of a transformer 85 to a normally open manually operated switch 86 and a relay coil 87 and capacitor 88 paralleling the relay coil. The primary of transformer 85 is connected across the supply lines 1 and 2. The relay coil 87 controls the operation among others of contact 89 providing a holding circuit about manually operated switch 86. The relay of coil 87 also controls the operation of the contacts 4, 19, 28 and 34 from their normal positions shown in Figure 1 to the opposite operated position. A second secondary 91 of transformer 85 supplies the cathode heaters of the tubes 22, 67 and 81.

In the description of the circuit, conventional elements such as surge bypass capacitors, fuses, thermal flow switches and others have been eliminated although these would be present in a normal operating circuit. This elimination of conventional parts has been effected for purposes of simplicity, their position and function being well known to those familiar with the art, the sequencing portions of the system above described being described and claimed in Patent No. 2,634,320, issued April 7, 1953, to E. G. Anger and assigned to applicant's assignee.

As previously described, the firing relay of coil 47 operates to first close contacts 30, 40 and by inherent delay closes contact 20 in the first half cycle thereafter. Contact 40 connects the anode 96 of electronic firing tube 97 to the anode of ignitron tube 53 which, through conventional inverse parallel connection, is connected to the cathode of ignitron 54 and thence to one side of the primary of welder transformer 55, the opposite side of which is connected to line 2. The igniter of ignitron 53 is connected to the cathode 98 of firing tube 97 and the cathode is connected to one side of secondary winding 99 of transformer 101, the opposite side of secondary 99 being connected through resistor 102 to the control grid 103 of firing tube 97. The anode of ignitron 54 is connected to the cathode of ignitron 53 and to line 1 and is also connected through contacts 30 to the anode 104 of electronic firing tube 105. The igniter electrode of ignitron 54 is connected to the cathode 106 of firing tube 105 and this cathode is connected to one side of a second secondary winding 107 of transformer 101, the opposite side of which is connected through a resistor 108 to the control grid 109 of tube 105.

A phase shift circuit is provided by a bridge circuit comprising as legs thereof the portions 111 and 112 of the secondary winding of transformer 113, the capacitor 114, and serially connected adjustable resistors 115 and 116. The primary 117 of transformer 101 is connected across the phase shift bridge thus provided by being connected to the mid point between winding portions 111 and 112 and the junction between capacitor 114 and the serially connected resistors 115 and 116. The adjustment of resistor 116 determines the percent of full current which is passed through the weld in each successive half cycle. The adjustment of resistor 115 compensates for the power factor of the load to determine normal optimum firing point for the ignitrons 53 and 54. Contact 20 when open interposes all of resistor 115 into the phase shift circuit and when closed shunts out the portion thereof determined by the setting of the adjustable slider.

The value of resistor 115 is selected with relation to the value of the other components of the phase shift circuit so that with resistor 116 set for 100% of full current the resistor 115 (contact 20 being open) will effect a phase shift to energize the control grid 103 of tube 97 to effect firing of that tube, and the firing of ignitron 53 therefrom, at a point on the time-phase voltage curve which is substantially 85° after voltage zero. In an ideal transformer this phase back would be 90° but due to voltage drop in the transformer and circuit and core losses, this is shifted to approximately 85°.

Contact 40 may close at any non-synchronized point on the voltage curve so long as the signal to control grid 103 is insufficient to fire tube 97. Therefore, after closure of contact 40, the ring of ignitron 53 to pass current through transformer 55 will be determined by the signal sent to the grid 103 by the phase shift circuit which, as above described, is preset by the resistor 115 to substantially 85°.

The operation of the circuit is as follows:

Prior to the operation of the manually operated switch 86, the valve solenoid 3 is deenergized as contact 4 is open. Contact 19 is closed, and capacitor 18 is charged to approximately the full voltage between conductors 7 and 8 through control grid rectification of tube 22. Contact 28 is, as illustrated, in an open condition thus disconnecting the anode 24 of tube 22 from the conductor 7. The contact 34 is closed, thereby shorting out capacitor 33, and the contact 89 is open, no path from secondary 84 through the tube 81 therefore existing. These contacts are mechanically arranged so that the normally closed contacts 19 and 34 will open before the normally open contacts 4, 28 and 89 close.

Upon closure of the manually operated switch 86, tube 81 will begin to conduct as soon as secondary 84 drives the anode 82 positive with respect to the cathode 83, the conduction of this tube serving to energize the relay coil 87. During the half cycle in which tube 81 does not conduct, due to improper polarity of the transformer secondary 84, the capacitor 88 serves to maintain the relay coil 87 in an energized condition in the conventional manner. As contact 19 opens, the control grid 21 of tube 22 is swept negative with respect to the cathode 23 of that tube due to the charge on capacitor 18. As contact 34 opens, the short across capacitor 33 is eliminated. As the contact 4 then closes, the valve solenoid 3 is energized and the welding electrodes act to apply pressure to the work in the conventional manner to start the "squeeze time" period. Closure of contact 28 completes the anode circuit of tube 24, but this tube cannot begin to conduct due to the charge on capacitor 18. Closure of contact 89 forms a non-beat holding circuit across the manually operated switch 86.

Tube 22 remains in the quiescent condition aforementioned for a period determined by the timing elements including the capacitor 18 and the resistors 16 and 17 in parallel therewith, these elements determining the length of the "squeeze time" period. The arrangement of the resistors 16 and 17 paralleling capacitor 18, this arrangement being fully and accurately described in the aforementioned issued patent, is such that the voltage difference between the control grid 21 and the cathode 23 is always slowly dissipated, thereby permitting control over the actual moment of initiating conduction of tube 22 by the pulsating voltage applied to the shield grid 25 occurring during the momentary conduction of the half wave rectifier 11, shield grid 25 rectification of tube 22 serving to aid the accuracy of control by clipping off any undue changes of pulse value due to line variations. Therefore, as the voltage difference between the control grid and the cathode of tube 22 is diminished, this tube is finally rendered conducting at a point determined by a positive pulse of voltage supplied to the shield grid 25.

Prior to the conduction of tube 22, the control grid 41 of tube 38 is negative with respect to the cathode 37 of that tube. The capacitor 42 is charged with a polarity according to this voltage difference. As tube 22 begins to conduct, the conductor 35 tends to carry the cathode 37 of tube 38 a negative amount due to the voltage drop across the adjustable resistor 32, this drop being due to conduction current of the tube 22. This has a tendency to cause the cathode 37 of tube 38 to become negative with respect to the control grid, but the charge on capacitor 42 momentarily prevents this occurrence. Inasmuch as tube 22, as previously mentioned, is rendered conducting by a positive pulse of voltage upon the shield grid 25 thereof, this positive pulse occurring adjacent to the mid point of a half cycle of voltage, if the capacitor 42 were not present tube 38 might begin to conduct during the latter half of a half cycle, thereby permitting a premature partial pulse of current through relay coil 47. Capacitor 42 prevents this unfavorable occurrence, the charge on the capacitor 42 being rapidly dissipated, however, through the resistors 43 and 44 so that precisely at the beginning of the next positive excursion of anode 39 voltage, tube 38 will conduct to energize the relay coil 47, the conduction therefore occurring only during the whole half cycle.

As current flows from the secondary 46 of transformer 45 through the relay coil 47 and the electronic tube 38, the armature of the relay acts to first close contacts 30 and 40 and, through inherent mechanical delay, to close contact 20 in the first half cycle after closure of contacts 30 and 40. With the closure of contacts 30 and 40, the conduction of ignitrons 53 and 54 is placed under the control of the firing tubes 97 and 105. The initial firing of ignitron 53 is effected at the phase back angle of substantially 85° as previously described, through the inclusion of all of resistor 115 in the phase shift circuit. With contact 40 closed, the signal voltage on the control grid 103 becomes sufficiently strong at 85° phase back angle so tube 97 conducts to pass current to the igniter electrode of ignitron 53 to effect conduction thereof to pass initial current through the transformer 55 at the optimum point for minimum magnetizing transient. In the next half cycle after closure of contacts 30 and 40, contact 20 closes to short out the portion of the resistor 115 provided by the normal setting of its slider, as determined by the power factor of the work, and the phasing of signal on grid 109 of tube 105 will be determined by the setting of the slider on resistor 115 so that firing of tube 105 and conduction of ignitron 54 will be at the normal setting of the phase shift circuit. It is therefore seen that the first half cycle conduction through ignitron 53 will be effected at optimum phase back angle for minimum magnetizing transient whereas succeeding half cycles will be effected at normal phase relationship.

Where the resistor 116 is set at less than 100% of full load current, the phase back angle will be greater than the substantially 85° optimum, but such additional phase back does not give rise to severe transients, but is well within acceptable limits.

It is particularly noted that in this circuit operation the point of closure of contacts 30 and 40 may vary over a wide range since the control of the conduction of the initial ignitron 53 is by the phase back signal to the grid 103 of the electronic firing tube 97 therefor. Thus, relay operation is substantially independent of supply voltage variations and mechanical change in relay constants.

During the half cycles of non-conduction of the tube 38, the capacitor 48 discharges through the relay coil 47 to maintain the relay in an energized condition. Tube 38 will continue to conduct and the relay coil 47 will remain energized, for a period determined by the timing combination comprising the adjustable resistor 32 and the capacitor 33. As conduction current of tube 22 passes through the resistor 32 and the capacitor 33 and subsequently through tube 22, a charge is built up upon the capacitor 33 until this charge is sufficiently large to cause the cathode 37 of tube 38 to become positive with respect to the control grid 41 thereof. When this condition prevails, tube 38 is cut off and no longer conducts. The time required to build a charge on capacitor 33 therefore determines the "weld time." Throughout this time current is conducted alternately in both directions by the ignitrons in the customary manner.

During the first half cycle after tube 38 stops conducting, capacitor 48 will act, as before described, to keep the relay coil 47 energized; during the half cycle following this occurrence, the inductor 49, which is in series with the capacitor 48, causes a definite and sharp reversal of current flow through the relay coil 47 to cause rapid and synchronous deenergization thereof, the contact 52 thereby returning to its normal open condition rapidly and with certainty during this half cycle. The mechanical delay of the relay further provides that this opening will not occur until after the "trail" ignitron has begun to conduct but will occur before it has ceased to conduct, the "trail" ignitron then conducting to the normal current zero. It will therefore be seen that current will flow during two, and only two, half cycles following the last half cycle of tube 38 conduction. It will further be seen that the last pulse of energy through the welding transformer will always have the same polarity. As has been previously indicated, weld current flow always starts with the opposite polarity.

During the period in which tube 38 conducts, the primary of transformer 51 drives the grid 57 of electronic tube 58 sufficiently positive to cause that tube to conduct. This conduction charges capacitor 62 through control grid 66 conduction of electronic tube 67. These pulses occur during the time when the anode 68 of tube 67 is negative with respect to the cathode 69 thereof, so that the tube 67 is immediately cut off by the charge on capacitor 62 and does not, therefore, conduct during the period in which tube 38 conducts.

The timing arrangement in the grid circuit of electronic tube 67 acts to permit the voltage of the cathode and grid to slowly approach a single value. Superimposed upon the decreasing voltage of capacitor 62 is a synchronizing, alternating ripple fed into the voltage divider circuit which comprises resistors 64 and 65 from the secondary 91. Tube 67 will therefore remain non-conductive until capacitor 62 has properly discharged through the circuit in parallel therewith, the actual instant of initiation of conduction being controlled by the positive drive of the synchronizing pulse.

Throughout the period in which tube 67 is quiescent, the control grid 72 of tube 73 is at approximately the potential of conductor 9 and is intermittently sufficiently positive so that the tube 73 will conduct to charge capacitor 76 through the control grid 79 conduction of electronic tube 81. Inasmuch as these current pulses occur during the half cycles in which the anode 82 of the tube 81 is positive with respect to the cathode 83 of that tube, tube 81 is not immediately cut off, as was the case with tube 67. Tube 81 therefore will continue to conduct until the before described timing control voltages of tube 67 are such that tube 67 will again resume conduction. The elements which determine these timing voltages thereby control the "hold time" of the circuit. The conduction of tube 67 will no longer permit the grid 72 of tube 73 to become sufficiently positive to permit tube 73 to conduct, so the charge on capacitor 76 cuts off tube 81 as soon as tube 67 begins to conduct. The timing circuit controlling conduction of tube 81 is the same as that before described for the control of tube 67, and therefore this function will not now be described. As soon as tube 81 is cut off, the relay coil 87 is deenergized and the contacts which it controls are returned to the position indicated in the drawing. Immediately after the circuit controlling the control grid 79 of tube 81 has timed out, this circuit controlling the "off" time in the welding cycle, tube 81 will once again conduct, provided initiated contact 86 is closed, to initiate another cycle as herein described.

In Figure 2 is shown a slightly modified circuit arrangement for the firing circuits of ignitrons 53, 54, the points A and B of Figure 1 and Figure 2 being common and the sequencing circuit arrangements of Figure 1 being thereby incorporated into Figure 2. Like reference numerals indicate like parts. In the circuit of Figure 2, a single contact 118 is substituted for the two contacts 30 and 40 of the circuit of Figure 1, but this simplification requires a further complication in the use of rectifiers in the igniter circuits for the ignitrons 54, 53. In this arrangement, the phase shift and phase back controls operate in the same manner as described in Figure 1, and the conduction of ignitrons 53, 54 is effected in the same manner with initial conduction of ignitron 53 phased back to the optimum point for minimum magnetizing transient and with succeeding half cycle of conduction of tubes 54 and 53 occurring at normal phase shift points as determined by the setting of resistors 115 and 116.

In the circuit of Figure 2, the anode of tube 97 is connected to the cathode of tube 105 and the anode of tube 105 is connected to the cathode of tube 97. The energization of the igniter electrodes for the ignitrons 53, 54 is controlled through the rectifiers shown so that current through the respective igniters can be passed only in the proper direction to effect desired conduction of the ignitron tubes and reverse flow is prevented.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit for effecting the passage of alternating current to a load, electronic discharge tubes connected to pass alternate half cycles of alternating current, means for selectively rendering said discharge tubes conducting, a phase back circuit controlling the point on the supply voltage wave at which said discharge tubes are rendered conducting, and means independent of current flow in the load for phasing back only the initial half cycle conducting point later than the normal conducting point to provide a minimum transformer circuit transient.

2. In a control circuit for effecting the passage of alternating current to a load, a pair of electronic discharge tubes connected to pass alternate half cycles of current, means for selectively rendering said discharge tubes conducting, a phase back circuit controlling the point on the supply voltage wave at which said discharge tubes are rendered conducting, means operating to render the first of said discharge tubes conducting at a point determined by the initial constants of said phase back circuit to initiate current flow with a minimum transient, means operating after initiation of conduction of said first discharge tube to change the constants of the phase back circuit to effect subsequent tube conduction at a normal operating point on the voltage wave, and means rendering the second discharge tube and the first tube after the first half cycle conducting at said normal operating point.

3. In a control circuit for effecting the passage of alternating current to a high flux density transformer feeding a load, a pair of electronic discharge tubes connected to pass alternate half cycles of alternating current to the transformer primary, means for selectively rendering said discharge tubes conducting, a phase shift circuit including a circuit element whose value determines the amount of phase shift of the voltage supplied by said phase shift circuit, means for rendering the first of said discharge tubes conducting at a phase shift point determined by the initial value of said circuit element to effect initial current flow in the first half cycle with a minimum transient, means varying said circuit element after initiation of conduction of said first discharge tube to vary the position of the phase shift voltage, and means for rendering the second discharge tube conducting in the second and subsequent half cycles and the first tube conducting after the first half cycle at a point on the supply wave determined by the altered value of said circuit element.

4. In a control circuit for effecting the passage of alternating current to a high flux density transformer feeding a load, electronic discharge tubes connected to pass alternate half cycles of alternating current to the transformer primary, a phase shift circuit including a circuit element whose value determines the degree of phase shift of the phase shift circuit voltage, an electromagnetic relay, cooperating contacts on said relay operated in response to energization thereof for connecting said discharge tubes to said phase shift circuit to selectively render said discharge tubes conducting, and an additional set of contacts on said relay closing after but within a half cycle of the closing of said first cooperating contacts and operating to short out at least a portion of said circuit element whereby to change the degree of phase shift and the point of tube conduction for the second and subsequent half cycles of current flow.

5. In a control circuit for effecting the passage of alternating current to a high flux density transformer feeding a load, electronic discharge tubes connecting to pass alternate half cycles of alternating current to the transformer primary, a phase shift circuit including an adjustable resistor whose value determines the degree of a phase shift of the phase shift circuit voltage, an electromagnetic relay, cooperating contacts on said relay operated in response to energization thereof for connecting said discharge tubes to said phase shift circuit to selectively render said discharge tubes conducting, and an additional set of contacts on said relay closing after but within a half cycle of the closing of said first cooperating contacts and operating to short out at least a portion of said adjustable resistor whereby to change the degree of phase shift and the point of tube conduction for the second and subsequent half cycles of current flow.

6. In a control circuit for effecting the passage of alternating current to a high flux density transformer feeding a load, a pair of electronic discharge tubes connected to pass alternate half cycles of alternating current to the transformer primary, a pair of electronic firing tubes connected to selectively render said discharge tubes conducting, a phase back circuit controlling the point on the supply voltage wave at which said firing tubes conduct, and means independent of current flow in the transformer for phasing back only the initial half cycle conducting point later than the normal conducting point for succeeding half cycles to provide a minimum transformer circuit transient.

7. In a control circuit for effecting the passage of alternating current to a high flux density transformer feeding a load, a pair of electronic discharge tubes connected to pass alternate half cycles of alternating current to the transformer primary, a pair of electronic firing tubes connected to selectively render said discharge tubes conducting, a phase back circuit controlling the point on the supply voltage wave at which said firing tubes conduct, and means independent of current flow in the transformer for phasing back only the initial half cycle conducting point to substantially 85° after voltage zero.

8. In a control circuit for effecting the passage of alternating current to a high flux density transformer feeding a load, a pair of electronic discharge tubes connected to pass alternate half cycles of alternating current to the transformer primary, a pair of electronic firing tubes connected to selectively render said discharge tubes conducting, a circuit supplying a voltage shiftable in phase relative to the supply voltage by varying the circuit constants, said circuit voltage being applied to the control grids of said firing tubes to control the point on the supply voltage wave at which said firing tubes and therefrom said discharge tubes are rendered conducting, means for initiating current flow in the first half cycle at a point on the voltage wave determined by the initial constants of the voltage shift circuit to initiate current flow with a minimum transient, and means varying the constants of said voltage shift circuit prior to initiation of conduction of the second cycle of current whereby the second and succeeding half cycles of current are initiated at a point on the voltage wave for normal operation and different from the point of conduction of said first half cycle.

9. In a control circuit for effecting the passage of alternating current to a high flux density transformer feeding a load, a pair of electronic discharge tubes connected to pass alternate half cycles of alternating current to the transformer primary, a pair of electronic firing tubes connected to selectively render said discharge tubes conducting, a phase shift circuit controlling the firing of said firing tubes and having a circuit element whose value determines the degree of phase shift and the point on the supply wave at which said firing tubes and therefrom the discharge tubes are rendered conducting, means for initiating conduction of the first of said discharge tubes in accordance with the initial value of said circuit element to initiate current flow in the first half cycle at a minimum transient, and means for varying the value of said circuit element after initiation of conduction of said first discharge tube and prior to conduction of the second discharge tube whereby conduction in the second and succeeding half cycles of current will be effected at a point on the supply wave determined by the varied value of said circuit element.

10. In a control circuit for effecting the passage of alternating current to a high flux density transformer feeding a load, a pair of electronic discharge tubes connected to pass alternate half cycles of alternating current to the transformer primary, a pair of electronic firing tubes connected to selectively render said discharge tubes conducting, a phase shift circuit supplying a voltage controlling the conduction of said firing tubes and including a circuit element whose value determines the degree of phase shift and the point on the supply wave at which said firing tubes and therefrom said discharge tubes are rendered conducting, an electromagnetic relay, means for effecting energization of said relay to initiate current conduction, cooperating contacts on said relay operated upon energization thereof to place conduction of said discharge tubes under the control of said firing tubes at a point determined by the position of the phase shift voltage, and additional cooperating contacts on said relay operating after said first cooperating contacts but within a half cycle of the operation thereof and effecting a change in the value of said circuit element to change the point of current initiation for the second and subsequent half cycles of current flow.

11. In a control circuit for effecting the passage of alternating current to a high flux density transformer feeding a load, a pair of electronic discharge tubes connected to pass alternate half cycles of alternating current to the transformer primary, a pair of electronic firing tubes connected to selectively render said discharge tubes conducting, a phase shift circuit supplying a voltage controlling the conduction of said firing tubes and including a circuit element whose value determines the degree of phase shift and the point on the supply wave at which said firing tubes and therefrom said discharge tubes are rendered conducting, an electromagnetic relay, means for effecting energization of said relay to effect current flow, cooperating contacts on said relay operating in response to energization thereof and connected to place conduction of said discharge tubes under the control of said firing tubes, said circuit element having an initial value to phase back the phase shift voltage to effect conduction of the first discharge tubes at substantially 85° later than voltage zero, and additional cooperating contacts on said relay operating after said first cooperating contacts and prior to initiation of conduction of the second half cycle of current, said additional cooperating contacts operating to short out at least a portion of said circuit element to move the phase shift voltage to its normal firing position for the second and subsequent half cycles of current flow.

References Cited in the file of this patent

UNITED STATES PATENTS 2,355,453     Livingston             Aug. 8, 1944